United States Patent [19]

Lindgren et al.

[11] Patent Number: 4,905,836
[45] Date of Patent: Mar. 6, 1990

[54] CONTAINER FOR JAMMING MEANS

[75] Inventors: Bo S. Lindgren, Spanga; Alf G. Nasvall, Sundbyberg, both of Sweden

[73] Assignee: U.S. Philips Corporation, New York, N.Y.

[21] Appl. No.: 111,000

[22] Filed: Oct. 20, 1987

[30] Foreign Application Priority Data

Feb. 9, 1987 [SE] Sweden .............................. 8700504-7

[51] Int. Cl.$^4$ .............................................. B65D 1/34
[52] U.S. Cl. ................................... 206/557; 220/401; 220/3.1
[58] Field of Search ............... 220/401, 402, 9.1; 206/557

[56] References Cited

U.S. PATENT DOCUMENTS

| 166,185 | 3/1928 | Lindsey | 220/401 |
| 2,501,379 | 3/1950 | Cranston . | |
| 3,050,073 | 3/1962 | McMillan | 220/401 |
| 3,765,336 | 10/1973 | Kulsik . | |
| 4,120,417 | 10/1978 | Aquino | 220/401 |
| 4,376,494 | 3/1983 | Bjurling | 220/401 |

FOREIGN PATENT DOCUMENTS 544415  8/1957  Canada .................................. 220/401

Primary Examiner—Joseph Man-Fu Moy
Attorney, Agent, or Firm—Robert J. Kraus

[57] ABSTRACT

The invention relates to a container for jamming means (4), for example, radar chaff, IR burning bodies or similar. Such containers (1) filled with jamming means (4) are arranged behind each other in a storing space in connection to dispensing device on an aircraft, for example, an aeroplane. For the purpose of diverting or for other purpose the containers are dispensed from the dispenser device. The container according to the invention comprises a frame construction (2) and a loosely installed insert (3) in this frame construction defining a space for the jamming means (4). The assembled container has a low weight in combination with good rigidity when the insert is installed in the frame construction, but in a separated condition as the frame construction and the insert are easily deformable.

8 Claims, 2 Drawing Sheets

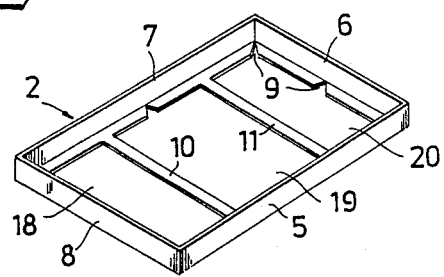
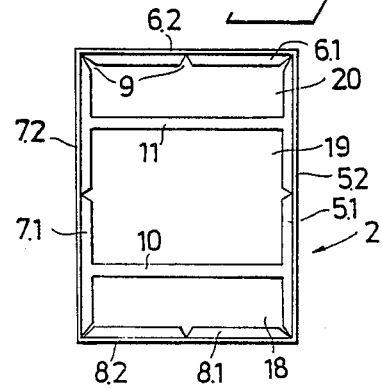
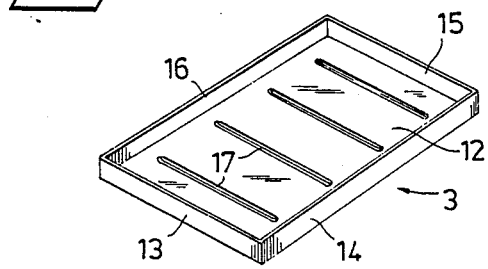
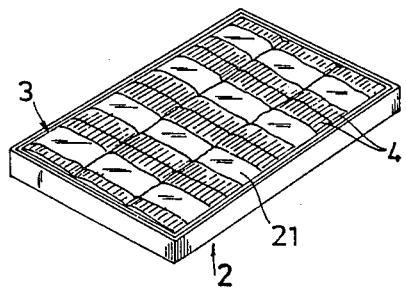

CONTAINER FOR JAMMING MEANS

BACKGROUND OF THE INVENTION

The invention relates to a container for jamming means, for example radar chaff, IR-burning bodies or similar, and intended to be brought with an aircraft and to be dispensed from the aircraft for the purpose of diverting or other purpose, the container having a box-like shape.

In this connection jamming means means both active jamming means, such as IR-burning bodies and passive jamming means, such as radar chaff. Other examples of jamming means are smoke delivering means and radar reflectors.

From, for example, U.S. Pat. No. 2,954,948 such a container having a box-like shape is previously known. A number of containers of this kind are kept together behind each other and are then fed into a dispensing device in order to be ejected one by one later on. Jamming means being ejected in this way show inter alia favourable target characteristics and admit a favourable control of the dispensing.

SUMMARY OF THE INVENTION

An object of the invention is to obtain a container having a low weight, thereby maximizing the carrying capacity for jamming means, but which container nevertheless has enought rigidity. It is important that the container before dispensing has such a rigidity that the handling properties when, for example, storing, transporting or loading not are deteriorated. Besides the containers have to cope with the environment offered by the dispensing device, i.e. among other things they have to cope with the forces that the containers are subjected to during the movement of the craft and especially in combination with simultaneous dispensing of containers. Stoppage of operation in the dispensing device due to insufficient rigidity of the containers has to be avoided.

The object of the invention is obtained in that the container comprises a frame construction and an insert defining a space for the jamming means preferably loosely installed in this construction. The frame construction and the insert are each relatively deformable elements. When the insert is installed in the frame construction an essentially more rigid unit is obtained. The reason is that the rigidity built-in in the frame construction and the insert cooperate in a favourable way. As a separate element the insert is relatively rigid in the plane of the frame construction, while the frame construction is relatively rigid in a direction transverse to the plane of the frame construction.

When the container is dispensed from the dispenser device on a craft, for example, an air-plane, the jamming means carrying insert is separated from the frame construction relatively quickly and the spreading of the jamming means starts. The frame construction is retarded in the air streams surrounding the air plane. The frame construction does not constitute any greater air hole and will consequently follow a more well defined and predictable ballistic curve and the risk of collisions between the frame and the air plane dispensing the frame construction or a following plane may be reduced thereby. In the case that the frame construction nevertheless should collide with an object, the risk of damage is eliminated in that the frame construction when the insert has ben separated from the frame construction no longer is a rigid construction.

In order to weaken the frame construction furthermore, the container according to a favourable embodiment may be characterized in that the frame construction is provided with special weakenings.

BRIEF DESCRIPTION OF THE DRAWING

The invention will be described in more detail by means of embodiments with reference to the accompanying Figures, in which FIGS. 1a–d in a perspective view show a first embodiment of the container.

DESCRIPTION OF THE PREFERRED EMBODIMENTS

Figure 2:
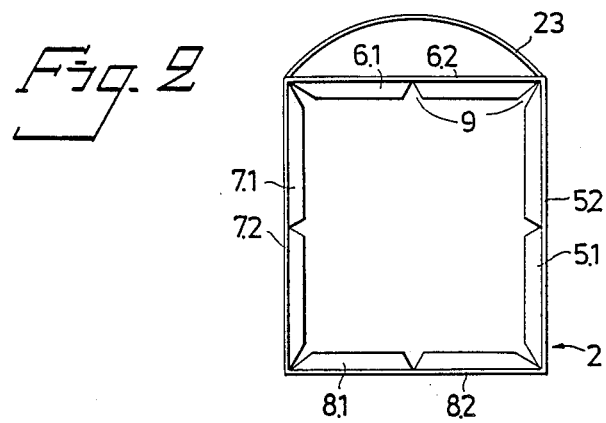
FIG. 2 shows a second embodiment of the frame construction in plan view.

A first embodiment of the container is shown in FIG. 1. FIG. 1a shows the frame construction or the frame, as it will be denoted below, in a perspective view. FIG. 1b shows a plan view of the frame according to FIG. 1a. FIG. 1c shows a perspective view of the insert in the shape of an insertion box. FIG. 1d shows a perspective view of a container according to the first embodiment comprising the frame 2 according to FIG. 1a in which the insertion box 3 according to FIG. 1c is inserted and filled with radar chaff 4. The frame 2 consists of four angular shaped elements 5, 6, 7 and 8 arranged in an essentially rectangular configuration, so that the angular shaped elements 5 and 7 are mutually parallel and the angular shaped elements 6 and 8 are mutually parallell. Each angular shaped elment consists of a first and a second section disposed at right angles. The first section 5.1, 6.1, 7.1 and 8.1 of each angular shaped element is situated in a plane common to the four angular shaped elements, while the second section 5.2, 6.2, 7.2 and 8.2 of the angular elements form an exterior limitation for the circumference of the frame 2. The first sections 5.1, 6.1, 7.1, 8.1 of the angular shaped elements 5, 6, 7, 8 are provided with a number of recesses 9 in order to reduce the rigidity of the frame 2 in the frame plane. The number of recesses and the location of the recesses are chosen in dependence of the requirements required for i.e. the rigidity of the frame in different directions. Instead of the recesses shown, the weakenings may be incorporated in the frame material. Two beams 10 and 11 are disposed between and parallel to the angular shaped elements 6 and 8. The insertion box 3 consists of a rectangular bottom plate 12 provided with four walls 13, 14, 15, 16. The bottom plate 12 is provided with a number of parallel grooves 17. These grooves 17 are so distributed along the bottom plate 12 of the insertion box 3, that the grooves 17 when the insertion box 3 is inserted in the frame 2 are situated in apertures 18, 19, 20 of the frame 2, the apertures being defined by the beams 10, 11 and the parallel angular shaped elements 6, 8 parallel to the beams.

An insertion box 3 filled with jamming means is shown provided in the frame 2 in FIG. 1d. The jamming means 4 here consist of radar chaff divided into groups. Each group is surrounded by a wrappers, preferably of paper. The groups of radar chaff surrounded by joints are here shown as having essentially the same length. However, it is quite possible to arrange groups of radar chaff having different lengths all according to the target characteristics that the radar chaff simulate.

The embodiment shown in FIG. 2 of the frame comprises in addition to the angular shaped elements 5, 6, 7, 8 specified with reference to FIG. 1, an arched section 23 disposed between the ends of the angular shaped element 6. The shape of the frame shown in FIG. 2 adapts the container to the available storage space in the dispenser device.

Figure 3:
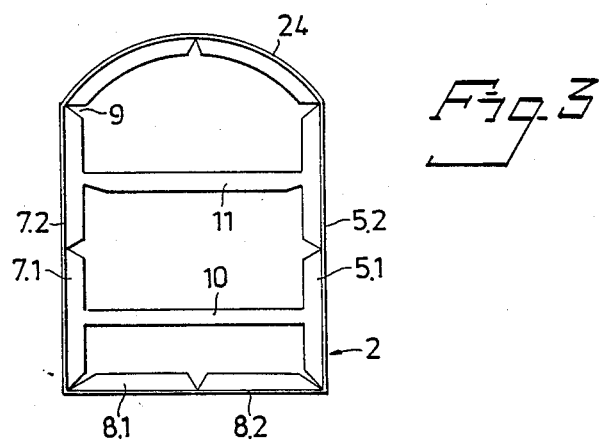
FIG. 3 shows a third embodiment of the frame construction in plan view and FIG. 4 shows a cut through a part of the frame construction and illustrates an example of a way of coupling two containers together by means of the frame constructions of the containers.

The frame shown in FIG. 3 optimizes the jamming means space in respect of the shape of the available storage space. The angular shaped element 6 is in this case replaced with an arched angular shaped element 34.

Figure 4:
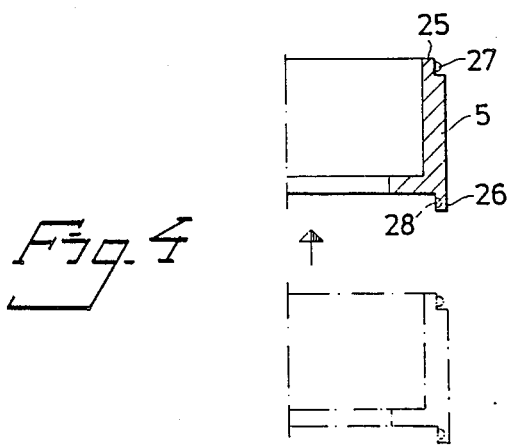

FIG. 4 shows a cut through a part of the frame. The cut is intended to show a way of coupling of number of frames together to a connected unit. The second sections 5.2, 6.2, 7., 8.2 of the angular shaped elements are hereby provided with a tapering termination 25, 26 along the two longitudinal sides. The tapering terminations 25, 26 are so displaced laterally that two adjacent frames overlap each other at the tapering terminations 25, 26. Along the tapering terminations 25, 26 a number of lock means are arranged connecting adjacent frames. The lock means consist in the embodiment shown of projecting means 27 engaging with grooves 28. The grooves 28 are disposed on one of the tapering terminations 26 and the projecting means 27 on the other tapering termination 28. The lock means described above are only given as a non-limiting example and a lot of variants are conceivable within the scope of the invention.

We claim:

1. A weight minimized container for jamming means to be ejected from a dispensing device carried by an aircraft, said container comprising:
   (a) a frame member of generally open construction, said frame member being readily deformed by forces directed in a first plane but being resistant to deformation by forces directed in a second plane transverse to the first plane; and
   (b) an insert member fitting loosely in the frame member for holding the jamming means, said insert member being readily deformed by forces directed in the second plane, being resistant to deformation by forces directed in the first plane, and being readily separated from the frame member by air flow when the container is ejected from the dispensing device;
   said members cooperating when assembled to resist deformation by forces directed in both the first and second planes.

2. A container as claimed in claim 1, characterized in that the frame member comprises four angular shaped elements disposed in an essentially four sided configuration so that a first section of each angular shaped element is situated in a common plane and a second section of each angular shaped element forms an exterior limitation for the circumference of the frame construction perpendicular to the common plane.

3. A container as claimed in claim 2, characterized in that a number of beams are disposed essentially parallel to two of the angular shaped elements in the four sided configuration.

4. A container as claimed in claim 2 or 3, characterized in that the frame member is provided with weakenings.

5. A container as claimed in claim 4, characterized in that the weakenings consist of recesses provided in the second section of the angular shaped elements.

6. A container as claimed in claim 4, characterized in that the weakenings consists of material weakenings inherent in the angular shaped elments.

7. A container as claimed in claim 2 or 3, characterized in that the insert member comprises an essentially flat bottom plate and a surrounding rim.

8. A container as claimed in claim 7, characterized in that bottom plate comprises a number of parallel grooves so disposed that the grooves are disposed adjacent open portions of the frame member.

* * * * *